(12) United States Patent
Oren (10) Patent No.: US 9,439,144 B2
(45) Date of Patent: Sep. 6, 2016

(54) SYSTEMS AND METHODS FOR REDUCING POWER CONSUMPTION

(71) Applicant: Elad Oelad Oren, Tel Aviv (IL)

(72) Inventor: Elad Oelad Oren, Tel Aviv (IL)

(73) Assignee: Intel IP Corporation, Santa Clara, CA (US)

(*) Notice: Subject to any disclaimer, the term of this patent is extended or adjusted under 35 U.S.C. 154(b) by 349 days.

(21) Appl. No.: 14/227,062

(22) Filed: Mar. 27, 2014

(65) Prior Publication Data

US 2015/0282081 A1    Oct. 1, 2015

(51) Int. Cl.
  *H04M 1/00*  (2006.01)
  *H04B 1/38*  (2015.01)
  *H04W 52/02*  (2009.01)
  *H04W 76/02*  (2009.01)

(52) U.S. Cl.
  CPC ....... *H04W 52/0219* (2013.01); *H04W 76/022* (2013.01); *H04W 76/023* (2013.01); *Y02B 60/50* (2013.01)

(58) Field of Classification Search
  USPC ........................................................ 455/574
  See application file for complete search history.

(56) References Cited

U.S. PATENT DOCUMENTS

| 8,259,632 | B2* | 9/2012 | Seok | H04W 52/0225 370/311 |
| 8,767,600 | B2* | 7/2014 | Seok | H04W 52/0219 370/311 |
| 2008/0219228 | A1* | 9/2008 | Seok | H04W 52/0225 370/338 |
| 2010/0271995 | A1* | 10/2010 | Seok | H04W 52/0219 370/311 |

FOREIGN PATENT DOCUMENTS

| KR | 1020090132592 | 12/2009 |
| KR | 101068756 | 9/2011 |
| KR | 102014006720 | 1/2014 |

OTHER PUBLICATIONS

International Search Report and Written Opinion for PCT Application No. PCT/US2015/018461 mailed Jun. 29, 2015.

* cited by examiner

*Primary Examiner* — Ankur Jain
(74) *Attorney, Agent, or Firm* — Sutherland Asbill & Brennan LLP (57) ABSTRACT

Systems and methods that may reduce power consumption are disclosed. A Tunneled Direct Link Setup (TDLS) session may be facilitated between a first mobile device and a second mobile device via an access point. The access point may receive a first power save notification from the first mobile device indicating a change in operation mode of the first mobile device. The access point may transmit the first power save notification to the second mobile device, and may receive a second power save notification from the second mobile device intended for the first mobile device indicating a change in operation mode of the second mobile device. The access point may receive a third power save notification from the second mobile device intended for the access point, and may buffer the second power save notification. The access point may transmit the buffered second power save notification to the first mobile device.

30 Claims, 4 Drawing Sheets

SYSTEMS AND METHODS FOR REDUCING POWER CONSUMPTION

TECHNICAL FIELD

This disclosure generally relates to systems and methods for reducing power consumption, and more particularly to reducing power consumption of mobile devices.

BACKGROUND

Mobile devices have become an integral part of the computing landscape. As mobile devices become more capable they have shifted to perform tasks that have traditionally been performed by non-mobile computers. In one example, mobile devices may have the ability to stream media or otherwise consume large amounts of data at relatively high data transfer speeds. The ability to consume large amounts of data at relatively high data transfer speeds may cause strain on components of a network, for example by creating a high load on an access point within a wireless network. In some instances, two mobile devices may be connected through a Tunneled Direct Link Setup (TDLS) connection, thereby reducing the load on an access point and optimizing performance. As a result of intensive communication and hardware usage, consuming large amounts of data may strain components of a mobile device itself, such as a battery of a mobile device and reduce the amount of time a mobile device may be used. Accordingly, systems and methods of reducing power consumption may be desired.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Example embodiments of the disclosure may provide systems and methods for reducing power consumption of user devices, such as mobile communication devices, or mobile devices as referred to herein. Example embodiments may include a first user device that is configured to engage in a Tunneled Direct Link Setup (TDLS) session with a second user device, for example via an access point. The first and second user devices may communicate data directly with each other during the TDLS session, for example streaming media from the first device to the second device. During a TDLS session, data transmitted from one user device to another may be encapsulated, for example, in internet protocol (IP) packets, thereby providing transparent transmission, or tunneling, via the access point, and further ensuring the access point remains unaware of, or otherwise blind to, data transmitted during the TDLS session between the first and second user devices. The TDLS session may therefore reduce network traffic load on the access point.

However, during a TDLS session between the first and second user devices, one of the user devices may wish to enter a different operation mode, such as a power save mode or a different communication channel. Before entering a different operation mode, the user device wishing to enter the power save mode, for example, may communicate its change to the other user device, according to Institute of Electrical and Electronics Engineers (IEEE) 802.11z specifications. However, if the other user device itself is in, for example, a power save mode or otherwise unavailable, the user device wishing to enter the power save mode may have to wait until the other user device returns to its original operation mode, or is otherwise "awake" or available and able to receive traffic through the TDLS connection. TDLS connections may therefore provide a biased advantage to the first user device that changes operation mode, which may reduce the ability of one user device to save power or engage in multiple roles on other channels. Once the previously unavailable user device is awake, the user device wishing to enter the power save mode or other operation mode may communicate this operation mode change to the newly awake user device and subsequently enter the power save mode or other desired operation mode. Because one user device may have to wait for the other user device to return to the TDLS connection or otherwise become available, the waiting user device may be unable to enter a power save mode at a desired time, thereby unnecessarily consuming power while waiting for the unavailable user device to become available. This may not only create unnecessary power consumption for the waiting user device, but may further prevent the waiting user device from performing other tasks, which may occur when the waiting device is performing multiple roles, as discussed below.

According to certain example embodiments of the disclosure, the waiting user device may be able to enter a power save mode or otherwise change operation mode without waiting for the unavailable user device to become available. For example, a system may include a first mobile device, a second mobile device, and an access point in communication with the first and second mobile devices. In this example, the second mobile device may be the waiting user device discussed above and the first mobile device may be the unavailable user device discussed above. The second mobile device, or the waiting user device, may be configured to transmit a power save notification indicating that it is changing operation modes without waiting for the first mobile device, or the unavailable user device, to become available. For example, the second mobile device may receive a power save notification from the first mobile device alerting it that the first mobile device is unavailable because the first mobile device is in, for example, sleep mode. The second mobile device may transmit a power save notification to the access point intended for the first mobile device while the first mobile device is still unavailable, where the power save notification indicates the second mobile device is entering a power save mode or is otherwise unavailable. The access point may buffer the power save notification from the second mobile device until the first mobile device becomes available, at which point the first mobile device receives from the access point the power save notification buffered by the access point and thereby becomes aware the second mobile device is unavailable. This example illustration, along with other examples and embodiments, are discussed in detail below. By allowing the access point to buffer the power save notification from the second mobile device, the second mobile device need not wait for the first mobile device to become available in order for the second mobile device to enter a power save mode, thereby reducing power consumption of the second mobile device. In some embodiments discussed herein where the second mobile device may be engaged in multiple roles, instead of entering a power save mode, the second mobile device may switch roles and become unavailable to the first mobile device for purposes of the TDLS session. For example, the second mobile device may be playing multiple roles on different channels, and therefore may have to switch channels periodically in order to perform each of its roles. In this instance, when the second mobile device is not operating on a specific channel, it may provide a power save notification to inform, for example, the first mobile device it is unavailable, as discussed below.

In example embodiments, the mobile devices discussed herein may have one or more antennas and/or transceivers, such as antennas and/or transceivers (i.e. radios) for communicating with, for example, one another and/or the access point. In example embodiments, the mobile devices may be configured to turn off or otherwise disable their transceivers and associated circuitry for communication via WiFi or the access point while the mobile devices are in power save operation mode, such as a "sleep" mode. In other words, the mobile devices may not be able to transmit and/or receive data while in a power save operation mode. Therefore, while the mobile devices are not transmitting and/or receiving data through a TDLS connection for example, the mobile devices may be using relatively less power than if the radio and circuitry were turned on or enabled, as during a transmission or receiving of data, thereby reducing power consumption of the respective mobile device.

It will be appreciated that in example embodiments, the systems and methods described herein may provide for and result in increased functionality or reduced power consumption for mobile devices in a TDLS session by reducing or removing delays in operation mode changes for the mobile devices. In some embodiments, mobile devices may be able to leave a TDLS session while the other mobile device in the TDLS session is unavailable, or for example, sleeping, without delay or with reduced delay.

Figure 1:
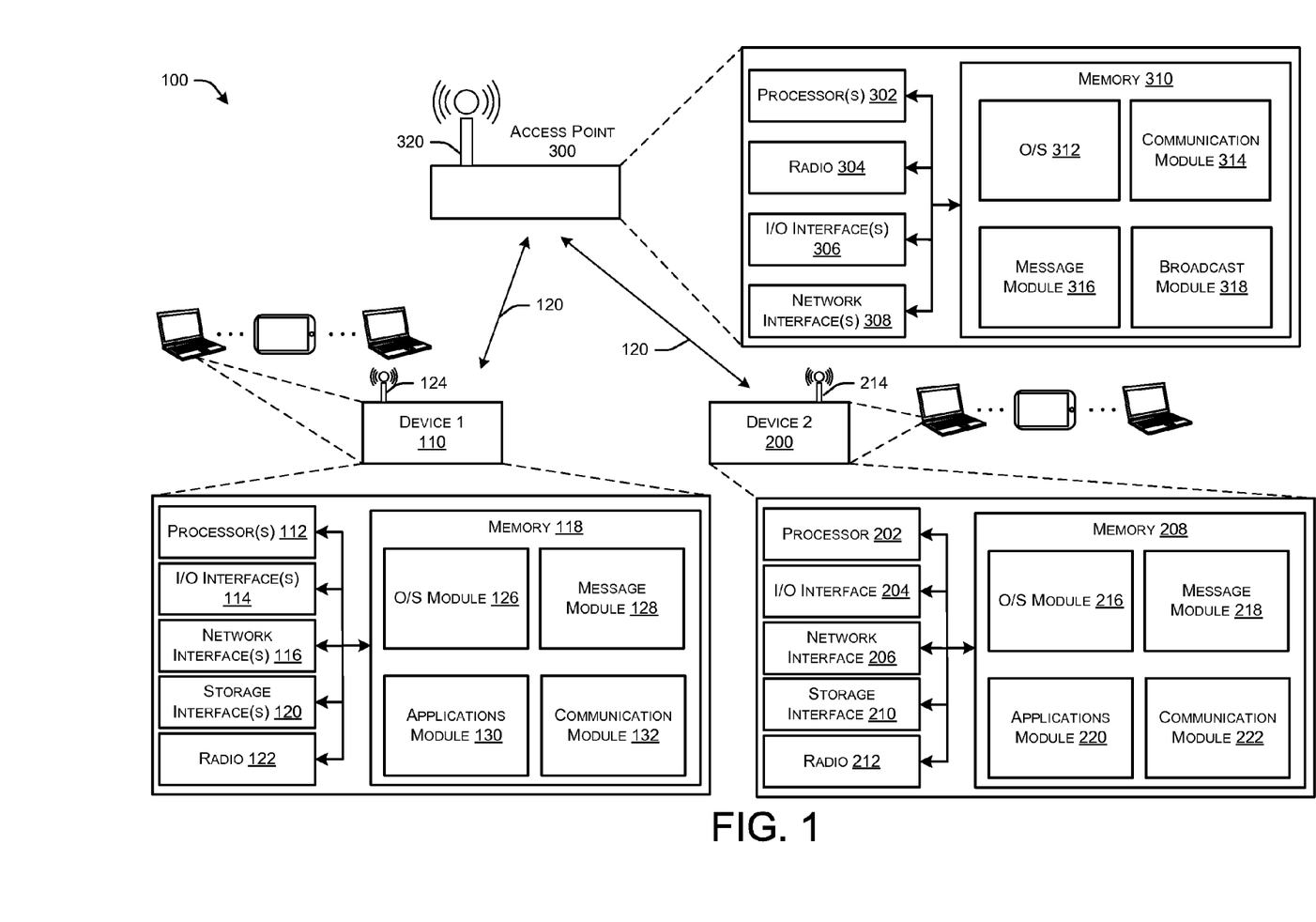
FIG. 1 is an illustrative schematic diagram of an example environment having a first user device and a second user device in communication with an access point (AP), in accordance with example embodiments of the disclosure.

Some example elements involved in the operation of the systems, methods, and apparatus disclosed herein may be better understood with reference to the figures. Referring now to FIG. 1, FIG. 1 is a simplified schematic diagram illustrating an example system 100 in accordance with embodiments of the disclosure. The system 100 includes a first mobile device 110 and a second mobile device 200 in wireless communication 120 with a wireless fidelity (WiFi) access point 300.

The first and second mobile devices 110, 200 may be any one of suitable devices that may be configured to execute one or more applications, software, and/or instructions to provide one or more services to a user. The first and second mobile devices 110, 200, as used herein, may be any variety of client devices, electronic devices, communications devices, and/or mobile devices. The first and second mobile devices 110, 200 may include, but are not limited to, tablet computing devices, electronic book (ebook) readers, netbook computers, Ultrabook™, notebook computers, laptop computers, desktop computers, personal digital assistants (PDA), smart phones, web-enabled televisions, video game consoles, set top boxes (STB), or the like. While the drawings and/or specification may portray the first and second mobile devices 110, 200 in the likeness of a smartphone, laptop, or tablet, the disclosure is not limited to such. Indeed, the systems and methods described herein may apply to any mobile device or user device utilizing communications bandwidth and configured to receive communications bandwidth from the access point 300. The mobile devices may be used by users for a variety of purposes, including functionality such as web browsing, business, communications, graphics, word processing, publishing, spreadsheets, databases, gaming, education, entertainment, media, project planning, engineering, drawing, or combinations thereof. Many of this functionality may use communications bandwidth provided via access point 300.

In the illustrated embodiment, the first mobile device 110 includes a processor 112, an input/output interface 114, a network interface 116, a memory 118, a storage interface 120, and a radio 122. Each component 112, 114, 116, 120, 122 may be communicatively coupled to the memory 118. The first mobile device 110 further includes an antenna 124 in communication with at least radio 122. The memory 118 includes an operating system module 126, a message module 128, an applications module 130, and a communications module 132. Similarly, the second mobile device 200 includes a processor 202, an input/output interface 204, a network interface 206, a memory 208, a storage interface 210, and a radio 212. Each component 202, 204, 206, 210, 212 may be communicatively coupled to the memory 208. The second mobile device 200 further includes an antenna 214 in communication with at least radio 212. The memory 208 includes an operating system module 216, a message module 218, an applications module 220, and a communications module 222. Although each of these components is shown in the illustrated embodiment, other embodiments may include additional or fewer components.

Each respective processor 112, 202 of the first and second mobile device 110, 200 may be implemented as appropriate in hardware, software, firmware, or combinations thereof. Software or firmware implementations of the processors 112, 202 may include computer-executable or machine-executable instructions written in any suitable programming language to perform the various functions described. Hardware implementations of the processors 112, 202 may be configured to execute computer-executable or machine-executable instructions to perform the various functions described. The processors 112, 202 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The first and second mobile devices 110, 200 may also include a chipset (not shown) for controlling communications between one or more processors 112, 202 and one or more of the other components of the first and second mobile devices 110, 200. The processors 112, 202 may also include one or more application specific integrated circuits (ASICs) or application specific standard products (ASSPs) for handling specific data processing functions or tasks. In certain example embodiments, the first and second mobile devices 110, 200 may be based on an Intel® Architecture system and the processors 112, 202 and chipset may be from a family of Intel® processors and chipsets, such as the Intel® Atom® processor family.

The input/output interfaces 114, 204 included in the first and second mobile devices 110, 200 may enable the use of one or more user interfaces for receiving user input and/or providing output to the user. A user may be able to administer the systems and methods disclosed herein by interacting with the first and second mobile devices 110, 200 via the input/output interfaces 114, 204. The input/output interfaces 114, 204 may be in the form of a touch screen, microphone, accelerometer sensor, speaker, or any other suitable input/output interfaces 114, 204 that may be used by the user to interact with the first and second mobile devices 110, 200.

The memory 118 of the first mobile device 110 and the memory 208 of the second mobile device 200 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 118 of the first mobile device 110 and the memory 208 of the second mobile device 200 may store program instructions that are loadable and executable on each respective processor 112, 202, as well as data generated or received during the execution of these programs. Turning to the contents of each memory 118, 208 in more detail, each memory 118, 208 may include several modules. Each of the modules and/or software may provide functionality for the first and second mobile devices 110, 200, when executed by the processors 112, 202. The modules and/or the software may or may not correspond to physical locations and/or addresses in each memory 112, 202. In other words, the contents of each of the modules may not be segregated from each other and may, in fact, be stored in at least partially interleaved positions on each memory 112, 202.

The memory 118 of the first mobile device 110 includes operating system module 126, and the memory 208 of the second mobile device 200 may include the operating system module 216. The processor 112 of the first mobile device 110 and the processor 202 of the second mobile device 200 may each be configured to access and execute one or more operating systems stored in the respective operating system modules 126, 216 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The memory 118 of the first mobile device 110 includes applications module 130, and the memory 208 of the second mobile device 200 may include the applications module 220. Each applications module 130, 220 may contain instructions and/or applications thereon that may be executed by each respective processor 112, 202 to provide one or more functionality associated with the directional transmission and reception of wireless signals and task processing. These instructions and/or applications may, in certain aspects, interact with each respective operating system module 126, 216 and/or other modules of the first or second mobile devices 110, 200. Each applications module 130, 220 may have instructions, software, and/or code stored thereon that may be launched and/or executed by the processors 112, 202 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The radio 122 of the first mobile device 110 and the radio 212 of the second mobile device 200 may be a transmit/receive component, such as a transceiver. The radios 122, 212 may include any suitable radio(s) and/or transceiver(s) for transmitting and/or receiving radio frequency (RF) signals in the bandwidth and/or channels corresponding to the communications protocols utilized by the first and second mobile devices 110, 200 to communicate with each other or with other user devices and/or via the access point 300. The radios 122, 212 may include hardware and/or software to modulate communications signals according to pre-established transmission protocols. The radios 122, 212 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radios 122, 212, in cooperation with their respective antennas 124, 214, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative embodiments, non-Wi-Fi protocols may be used for communications between the first and second mobile devices 110, 200, such as Bluetooth, dedicated short-range communication (DSRC), or other packetized radio communications. The radios 122, 212 may include any known receiver and baseband suitable for communicating via the communications protocols of the first and second mobile devices 110, 200. The radios 122, 212 may further include a low noise amplifier (LNA), additional signal amplifiers, an analog-to-digital (A/D) converter, one or more buffers, and digital baseband. The radios 122, 212 may further be configured to receive and/or transmit signals of the mobile communications network including protocols, such as GSM, 3G mobile communication, 4G mobile communication, LTE, WiMax, direct satellite communications, CDMA, TDMA, combinations thereof, or the like. The radios 122, 212 may yet further be configured to receive GNSS signals, such as via their respective antennas 124, 214.

The antenna 124 included in the first mobile device 110 and the antenna 214 included in the second mobile device 200 may be configured for receiving and/or transmitting communications signals from/to the access point 300. The antennas 124, 214 may be any suitable type of antenna corresponding to the communications protocols used by the first and second mobile devices 110, 200 for the particular signals received and/or transmitted via the antennas 124, 214. Some non-limiting examples of suitable antennas 124, 214 include directional antennas, non-directional antennas, dipole antennas, folded dipole antennas, patch antennas, multiple-input multiple-output (MIMO) antennas, or the like. Each antenna 124, 214 may be communicatively coupled to a radio component to transmit and/or receive signals, such as communications signals to and/or from the first and second mobile devices 110, 200.

The antennas 124, 214 may be configured to receive and/or transmit signals in accordance with established standards and protocols, such as Institute of Electrical and Electronics Engineers (IEEE) 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antennas 124, 214 may be configured to receive and/or transmit non-Wi-Fi protocol signals, such as Bluetooth, dedicated short-range communication (DSRC), or other packetized radio communications.

The access point 300 may include a processor 302, a radio 304, an input/output interface 306, and a network interface 308, with each component 302, 304, 306, 308 communicatively coupled to a memory 310. The memory 310 may include an operating system 312, a communication module 314, a message module 316, and a broadcast module 318. The access point 300 may further include an antenna 320, such as a WiFi antenna, as described above.

The access point 300 may be configured to communicate via one or more WiFi and/or WiFi direct protocols, as standardized by the Institute of Electrical and Electronics Engineers (IEEE) 802.11 standards. In certain embodiments, the access point 300 may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). The access point 300 may be connected to the first and second mobile devices 110, 200 via wireless connections 120. The access point 300 may be configured to allow the first and second mobile devices 110, 200 communicative connectivity. The access point 300 may be configured to receive association information, such as an SSID, an identification of the first and second mobile devices 110, 200, and/or password to establish a connection with the first and second mobile devices 110, 200.

Figure 2:
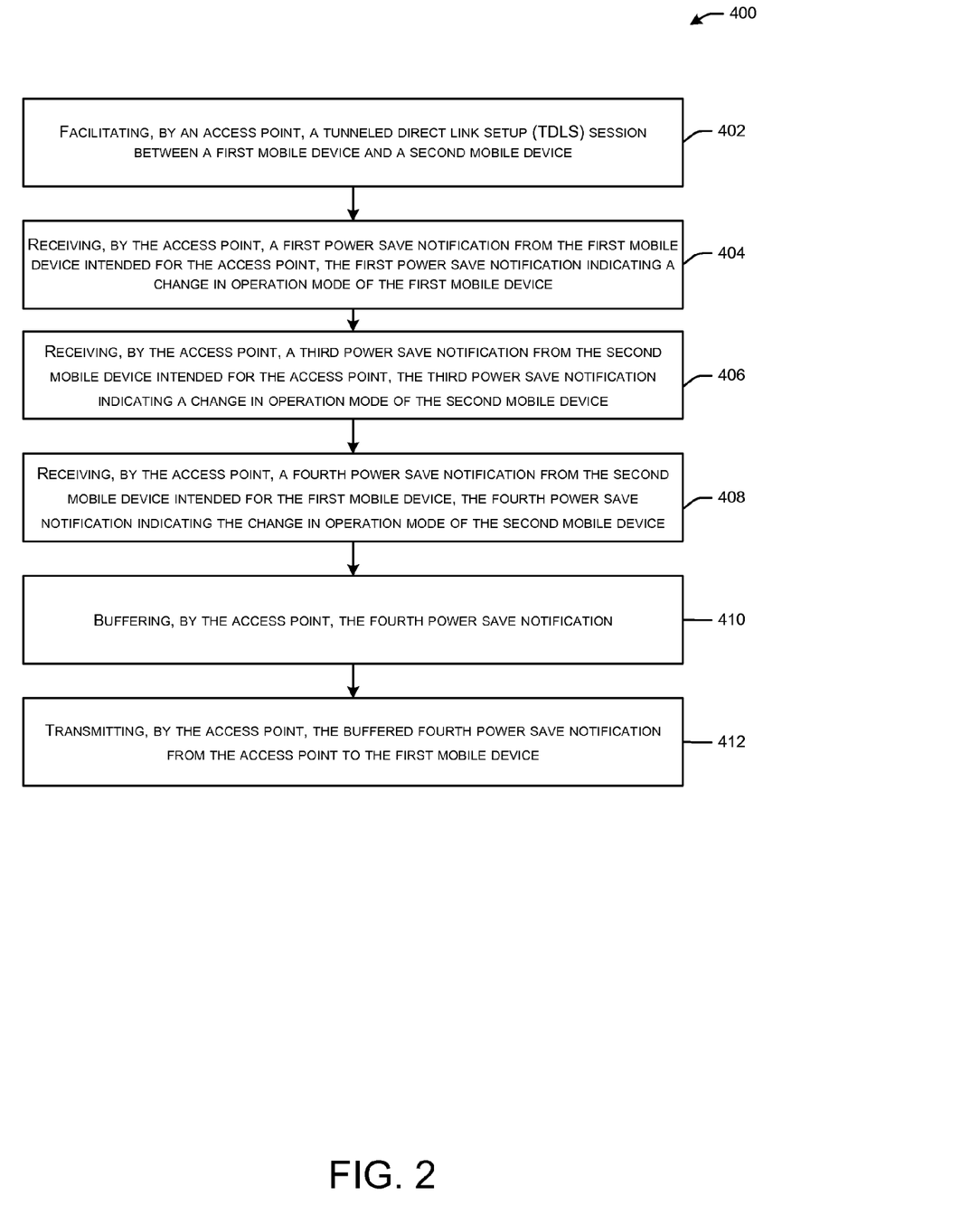
FIG. 2 is a flow diagram illustrating an example method for reducing power consumption, in accordance with certain example embodiments of the disclosure.
Figure 3:
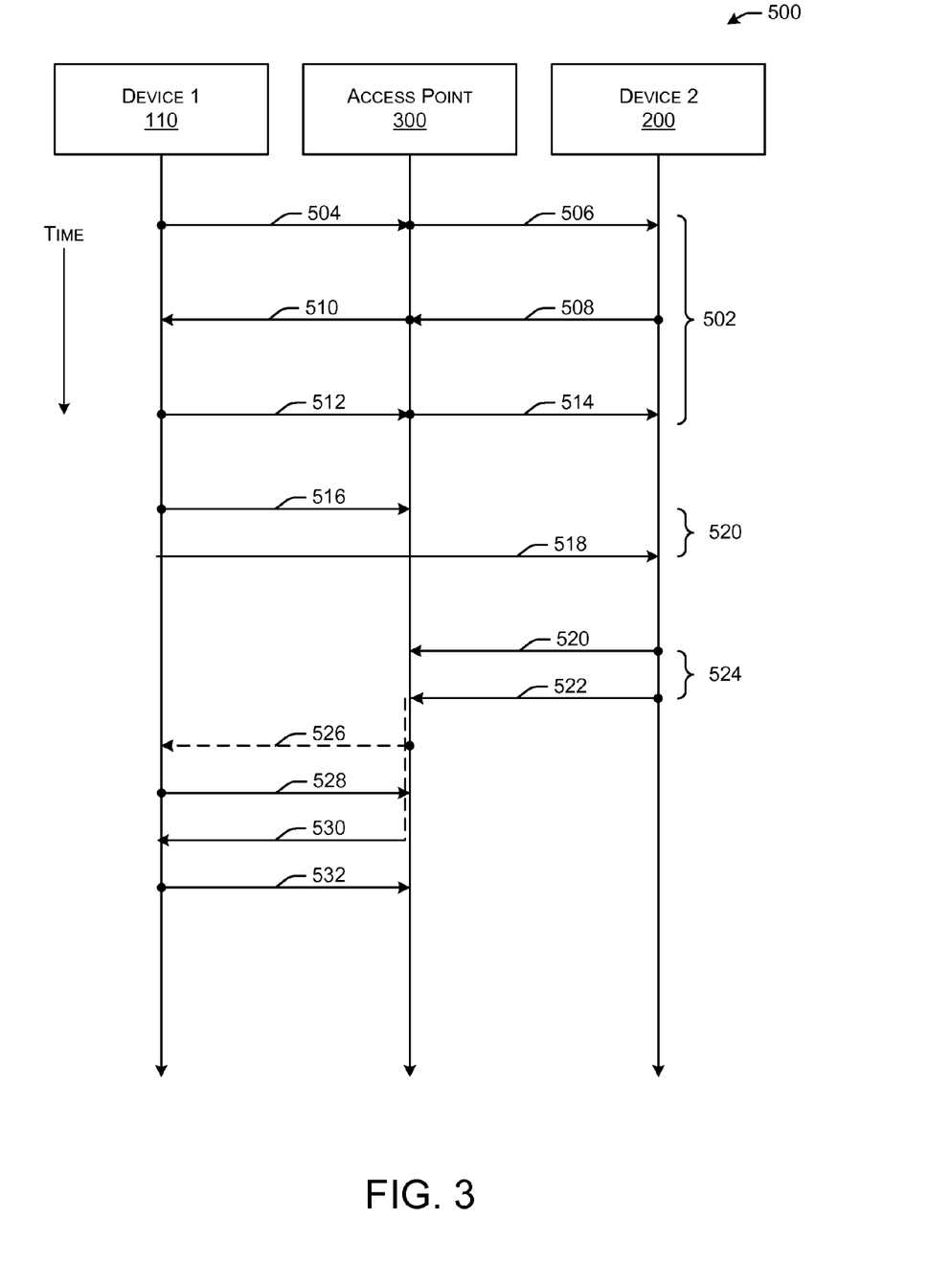
FIG. 3 is a dataflow diagram illustrating an example dataflow for the method of FIG. 2, in accordance with certain example embodiments of the disclosure.

Referring now to FIGS. 2 and 3, an example method 400 and an example data flow 500 for reducing power consumption according to one embodiment of the disclosure are illustrated and will be discussed in conjunction. Referring first to FIG. 2, method 400 illustrates one example for reducing power consumption, in accordance with one embodiment of the disclosure, that may be performed by an access point having features disclosed herein, for example access point 300. Referring now to FIG. 3, data flow 500 includes the first mobile device 110 in communication with the second mobile device 200 via the access point 300 and illustrates data flowing between the components along time, denoted by "Time" on the vertical axis.

Referring now to both FIGS. 2 and 3, in block 402 of FIG. 2, an access point facilitates a TDLS session between the first mobile device 110 and the second mobile device 200. Turning to FIG. 3, one embodiment of block 402 is illustrated by the communications and/or steps included in bracket 502. In this embodiment, at communication 504, the first mobile device 110 may transmit a TDLS setup request to the access point 300 using any of the appropriate above-described hardware. The access point 300 may receive the TDLS setup request from the first mobile device 110 using any of the appropriate above-described hardware and, at communication 506, transmit the TDLS setup request to the second mobile device 200. The TDLS setup request may instruct the second mobile device 200 to transmit a TDLS response frame. The second mobile device 200 may receive the TDLS setup request using any of the appropriate above-described hardware and in response, at communication 508, transmit a TDLS response frame to the access point 300. The access point 300 may receive the TDLS response frame from the second mobile device 200 and, at communication 510, transmit the TDLS response frame to the first mobile device 110. The first mobile device 110 may receive the TDLS response frame and in response, at communication 512, transmit a TDLS confirmation frame to the access point 300. The access point 300 may receive the TDLS confirmation frame from the first mobile device 110, and at step 514, transmit the TDLS confirmation frame to the second mobile device 200, thereby completing the steps included in bracket 502 and facilitating a TDLS session between the first mobile device 110 and the second mobile device 200, as included in block 402 of FIG. 2. During the TDLS session, the access point 300 may be entirely blind as to communication between the first and second mobile devices 110, 200. Although illustrated as occurring at different points along the vertical time axis, any portion of any of the operations or steps described above may occur at least partially concurrently with any portion of any other operation or step described above.

At a point in time after facilitating a TDLS session with the second mobile device 200, the first mobile device 110 may decide to change operation mode. In some instances, the first mobile device 110 may enter a power save mode to save battery power, while in other instances the first mobile device 110 may enter a "sleep" mode or otherwise disable hardware, such as a transceiver, in order to prolong battery life. In other instances, the first mobile device 110 may initiate a change in operation mode such as change communication channel, which may occur when the first mobile device 110 has multiple roles within a system. In another example, the first mobile device 110 may wish to change operation mode or leave a serving channel because it may be participating in roles on different channels, such as peer-to-peer group owner or peer-to-peer client.

Referring to blocks 404 and 406 of FIG. 2 and steps 516 and 518 included in bracket 520 of FIG. 3, when the first mobile device 110 decides to change operation mode, the first mobile device 110 may communicate a change in operation mode to the access point 300 by transmitting a first power save notification to the access point 300, as shown in step 516. The first power save notification may include a first data frame. In some embodiments, the power save notifications discussed herein may include a null data frame, with a special bit in the frame header designated a power management bit and positioned after an element identification and length bit in the frame. At block 404, the access point 300 may receive the first power save notification indicating a change in operation mode of the first mobile device 110. Referring to step 518, the first mobile device 110 may communicate a change in operation mode to the second mobile device 200 by transmitting a second power save notification to and intended for the second mobile device 200. The second power save notification may be include a second data frame, which may be, for example, a regular data frame or a null data frame with a power save bit set, which may include an indication of the current operation mode of first mobile device 110. The first and second power save notifications may be transmitted concurrently in some embodiments. The second mobile device 200 may receive the second power save notification from the first mobile device 110 and may therefore be notified that the first mobile device 110 may not be available for transmitting or receiving data over the TDLS connection. Upon completion of steps 516 and 518 in bracket 520, the first mobile device 110 may enter a power save operation mode, such as a sleep mode, or may change communication channels to otherwise engage in a role other than the TDLS session.

Referring now to blocks 406 and 408 of FIG. 2 and steps 522 and 524 included in bracket 526 of FIG. 3, after the first mobile device 110 has entered a different operation mode, the second mobile device 200 may wish to enter a different operation mode, such as a power save mode, or for example a different channel. In embodiments where the second mobile device 200 has multiple roles, or is, for example in a peer-to-peer client role in a different channel, the second mobile device 200 may need to be in the peer-to-peer serving channel at specific time intervals. If one of the designated time intervals falls within a time period where the second mobile device 200 is waiting for the first mobile device 110 to become available, the second mobile device 200 may be unable to leave the TDLS session and may miss the time at which it must be in the peer-to-peer client serving channel.

In order to change operation mode, the second mobile device 200 may notify the first mobile device 110 as to its updated operation mode. At this time, however, the first mobile device 110 is unavailable at the TDLS connection. Instead of waiting for the first mobile device 110 to return to the TDLS connection or otherwise become available, the second mobile device 200 may communicate its change in operation mode by sending a third power save notification to the access point 300, as shown in step 520. The third power save notification may be include a third data frame. At block 406, the access point 300 may receive the third power save notification from the second mobile device 200, the third power save notification indicating a change in operation mode of the second mobile device 200. At step 522, the second mobile device 200 may further communicate the change in its operation mode to the first mobile device 110 by transmitting a fourth power save notification to the access point 300 intended for the first mobile device 110. The fourth power save notification may be include a fourth data frame, which may be, for example, a peer traffic indication frame. The third and fourth power save notifications may be transmitted concurrently in some embodiments. At block 408, the access point 300 may receive the fourth power save notification intended for the first mobile device 110 from the second mobile device 200. Upon completion of steps included in bracket 524, or steps 520 and 522, the second mobile device 200 may enter, for example, a power save or sleep mode or otherwise engage in a different role.

Because the first mobile device 110 is still unavailable for the TDLS session at the time the second mobile device 200 enters a power save mode after completion of steps 524, referring now to block 410 of FIG. 3, the access point 300 may buffer the fourth power save notification intended for the second mobile device 200 from the first mobile device 110. Buffering by the access point 300 may include any of the schemes provided in the IEEE 802.11 standard.

At block 412 of FIG. 3, the access point 300 may transmit the buffered fourth power save notification to the first mobile device 110. Referring now to FIG. 3, at a point in time after the second mobile device 200 has entered a power save operation mode, the first mobile device 110 may return to its original operation mode, for example an "awake" state, or otherwise become available to the TDLS session. In some instances, the first mobile device 110 may become available at a specific, predetermined time interval, or at a Delivery Traffic Indication Message (DTIM) interval. A DTIM may be a traffic indication map that informs the mobile device of the presence of buffered data at the access point and may be generated at a frequency specified by the DTIM interval. A mobile device connected to the access point 300 will return to the access point 300 to determine if there is any buffered traffic or data waiting for the mobile device. An example DTIM interval may be, for example, 300 milliseconds.

Upon returning to its original operation mode or otherwise becoming available, the first mobile device 110 may attempt to determine a current operation mode for the second mobile device 200 for purposes of the TDLS session between the first and second mobile devices 110, 200. Depending on whether the first mobile device 110 returned to, for example, an awake state, at a DTIM interval or for some other reason such as a user command, optional step 526, as indicated by the dashed line, may be included. If the first mobile device 110 returned to the TDLS session because of the DTIM interval, then optional step 526 may be included. At step 526, the access point 300 transmits a beacon frame to the first mobile device 110 at a specific beacon interval that may be aligned with the DTIM interval. The beacon frame may be, for example, a traffic indication map configured to alert the first mobile device 110 of buffered data present at the access point 300. The first mobile device 110 may receive the beacon frame from the access point 300, where the beacon frame instructs the first mobile device 110 to transmit a trigger, for example a buffered data probe or any other trigger or communication configured to initiate action by the access point 300, to the access point 300 based at least in part or in response to the beacon frame, as shown by step 528.

If the first mobile device 110 returned to the TDLS session at a time other than the DTIM interval or for some other reason, such as a user command, then optional step 526 may not be included. Instead, the first mobile device 110 may automatically transmit a trigger, such as a buffered data probe, to the access point 300 as shown in step 528. At step 528, whether the first mobile device 110 returned to its original operation mode at the DTIM interval or for some other reason, the first mobile device 110 may transmit the trigger to the access point 300. The access point 300 may receive the trigger from the first mobile device 110, and based at least in part on the trigger, the access point 300 may transmit the buffered fourth power save notification to the first mobile device, as shown in step 530 and block 412 of FIG. 2. Upon receiving the fourth power save notification, the first mobile device 110 may determine a current operation mode of the second mobile device 200. At step 532, the first mobile device 110 may transmit an awake notification to the access point 300 intended for the second mobile device 200 so as to notify the second mobile device 200 that the first mobile device 110 is available, such that once the second mobile device 200 becomes available, the second mobile device 200 will be notified the first mobile device 110 is available. In some embodiments, the access point 300 may buffer the awake notification until the second mobile device 200 is available. In instances where the access point 300 does not have any buffered data present for either the first mobile device 110 or the second mobile device 200, the access point 300 may transmit a null data frame to the probing mobile device. Although some operations or steps are illustrated as occurring at different points along the vertical time axis in FIG. 3, any portion of any of the operations or steps described above may occur at least partially concurrently with any portion of any other operation or step described above.

It should be noted, that the method 400 may be modified in various ways in accordance with certain embodiments of the disclosure. For example, one or more operations of method 400 may be eliminated or executed out of order in other embodiments of the disclosure. Additionally, other operations may be added to method 400 in accordance with other embodiments of the disclosure.

Figure 4:
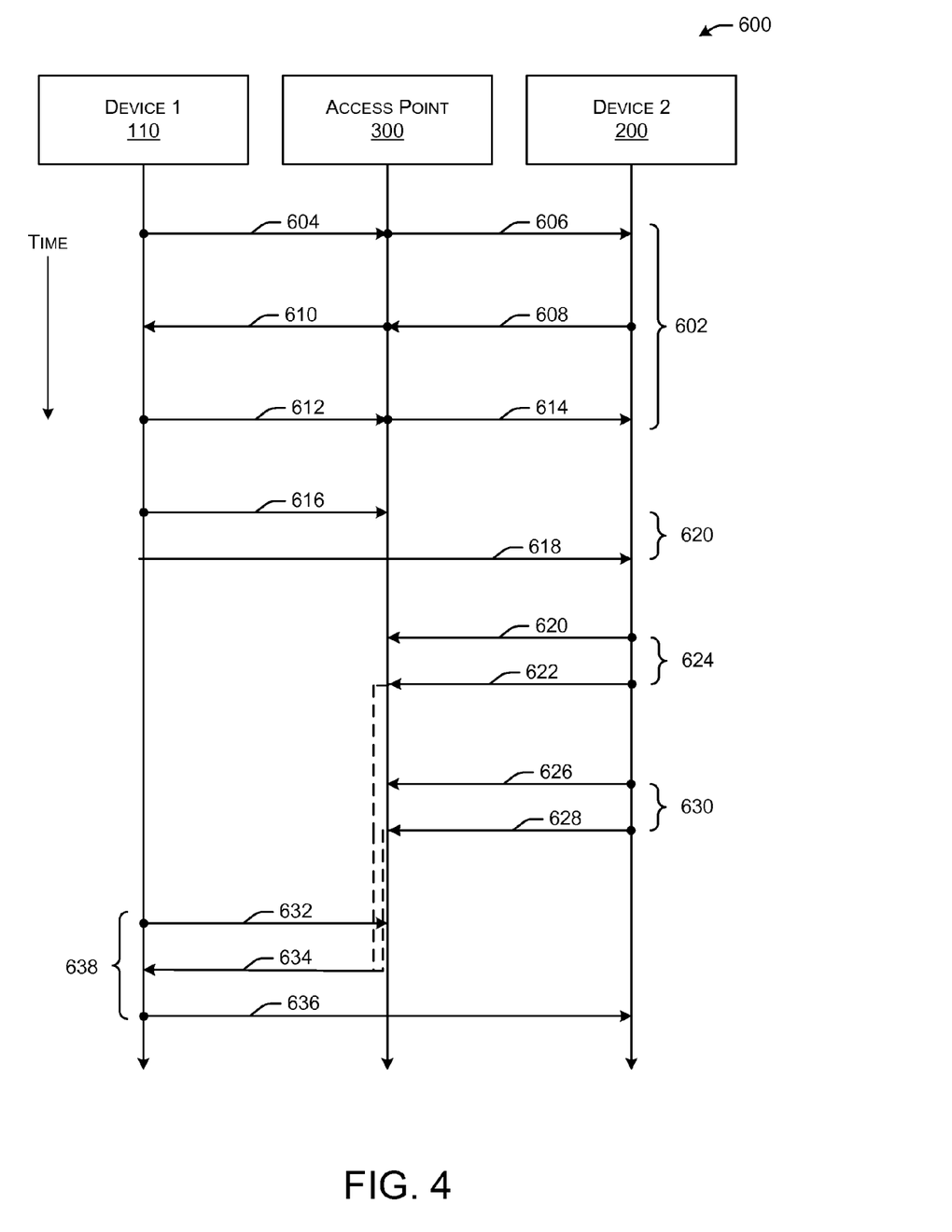
FIG. 4 is a dataflow diagram illustrating an alternative dataflow, in accordance with certain example embodiments of the disclosure.

Referring now to FIG. 4, an alternate embodiment of the disclosure is illustrated in dataflow 600. In this embodiment, a use case where the second mobile device changes operation modes and subsequently returns to an original operation mode before the first mobile device is available is depicted. Bracket 602 includes steps to facilitate a TDLS session between the first and second mobile devices 110, 200 via the access point 300 as discussed above. Communications 604-614 reflect communications 504-514 discussed above. For brevity, these steps are not repeated here. At bracket 620, the first mobile device 110 decides to change operation mode and notifies the access point 300 and the second mobile device 200. Communication 616 and 618, included in bracket 620, illustrate the first mobile device 110 communicating a change in operation mode to the access point 300 by transmitting a first power save notification to the access point 300, as shown in step 616. The first power save notification may include a first data frame. In some embodiments, the power save notifications discussed herein may include a null data frame, with a special bit in the frame header designated a power management bit and positioned after an element identification and length bit in the frame. At communication 618, the first mobile device 110 may communicate a change in operation mode to the second mobile device 200 by transmitting a second power save notification intended for the second mobile device 200. The second power save notification may be include a second data frame, which may be, for example, a regular data frame or a null data frame with a power save bit set, which may include an indication of the current operation mode of first mobile device 110. The first and second power save notifications may be transmitted concurrently in some embodiments.

At bracket 624, the second mobile device 200 decides to change operation mode before the first mobile device 110 has become available. Accordingly, as discussed above, the second mobile device 200 transmits a power save notification to the access point 300 at communication 620 and to the first mobile device 110 at communication 622. The access point 300 may buffer the power save notification intended for the first mobile device 110 received at communication 622. However, at bracket 630, the second mobile device 200 may return to its original operation mode or otherwise become available for the TDLS session while the first mobile device 110 is still unavailable. The second mobile device 200 may therefore transmit a first updated operation mode notification to the access point 300 at communication 626 indicating the second mobile device 200 has reverted to an original operation mode or is otherwise available for the TDLS session. The second mobile device 200 may transmit a second updated operation mode notification to the access point 300 at communication 628 intended for the first mobile device 110. The access point 300 may buffer the second updated operation mode notification in addition to the power save notification intended for the first mobile device 110 received at communication 622. In this manner, the current operation mode can be identified by the first mobile device 110 upon its return to the TDLS connection, as the access point 300 may buffer both the power save notification received at communication 622 as well as the second updated operation mode notification received at communication 628. The most recently transmitted notification from the second mobile device 200 may be used by the first mobile device 110 to determine a current operation mode of the second mobile device 200. At bracket 638, the first mobile device 110 may become available for the TDLS session and may transmit a trigger, such as a buffered data probe, to the access point 300 at communication 632. In response to, or based at least in part on, the communication 632, the access point 300 may transmit both the buffered power save notification and the buffered second updated operation mode notification from the second mobile device 200 at communication 634. The first mobile device 110 may therefore determine the current operation mode of the second mobile device 200 by determining the most recent notification. At communication 636, the first mobile device 110 may transmit an awake notification to and intended for the second mobile device 200 so as to notify the second mobile device 200 that the first mobile device 110 is available. Although some operations or steps are illustrated as occurring at different points along the vertical time axis in FIG. 4, any portion of any of the operations or steps described above may occur at least partially concurrently with any portion of any other operation or step described above.

The systems and methods described herein may result in increased functionality or reduced power consumption for mobile devices in a TDLS session by reducing or removing delays in operation mode changes for the mobile devices. In some embodiments, mobile devices may be able to leave a TDLS session while the other mobile device in the TDLS session is unavailable, or for example, sleeping, without delay.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

According to example embodiments of the disclosure, there may be a method. The method may include facilitating, via an access point comprising one or more computer processors, a tunneled direct link setup (TDLS) session between a first mobile device and a second mobile device. The method may include receiving, by the access point, a first power save notification from the first mobile device, the first power save notification indicating a change in operation mode of the first mobile device. The method may include receiving, by the access point, a second power save notification from the second mobile device intended for the access point, the second power save notification indicating a change in operation mode of the second mobile device. The method may further include receiving, by the access point, a third power save notification from the second mobile device intended for the first mobile device, the third power save notification indicating a change in operation mode of the second mobile device, and buffering, by the access point, the third power save notification. The method may include either (i) receiving, by the access point, a trigger from the first mobile device, and based at least in part on the trigger, transmitting the buffered third power save notification from the access point to the first mobile device, or (ii) transmitting a beacon frame from the access point to the first mobile device at a specific beacon interval. In response to the beacon frame, the method may include receiving by the access point a trigger from the first mobile device, and based at least in part on the trigger, transmitting the buffered third power save notification from the access point to the first mobile device. In some embodiments, the method may further include receiving, by the access point, a first updated operation mode notification from the second mobile device intended for the access point, the first updated operation mode notification indicating the second mobile device has reverted to an original operation mode, and receiving, by the access point, a second updated operation mode notification from the second mobile device intended for the first mobile device, the second updated operation mode notification indicating the second mobile device has reverted to an original operation mode. In example embodiments of the disclosure, the trigger is a buffered data probe received by the access point from the first mobile device. In example embodiments of the disclosure, the beacon frame is a traffic indication map configured to alert the first mobile device of buffered data present. In example embodiments of the disclosure, the first power save notification indicates the first mobile device has disabled transceiver hardware. In example embodiments of the disclosure, the first power save notification indicates the first mobile device has initiated a change in operation mode. In example embodiments of the disclosure, the tunneled direct link setup (TDLS) session between the first mobile device and the second mobile device may be facilitated by (i) receiving a TDLS setup request from the first mobile device, (ii) transmitting the TDLS setup request to the second mobile device, the TDLS setup request instructing the second mobile device to transmit a TDLS response frame, (iii) receiving the TDLS response frame from the second mobile device, (iv) transmitting the TDLS response frame to the first mobile device, (v) receiving a TDLS confirmation frame from the first mobile device, and (vi) transmitting the TDLS confirmation frame to the second mobile device.

In example embodiments of the disclosure, there may be a system. The system may include at least one memory that store computer-executable instructions and at least one processor configured to access the at least one memory. The at least one processor may be configured to execute the computer-executable instructions to transmit, by a first mobile device, a TDLS setup request to an access point, the access point in communication with the first mobile device and a second mobile device. The system may receive, by the first mobile device, a TDLS response frame from the second mobile device via the access point, and transmit, by the first mobile device, a TDLS confirmation frame, thereby establishing a TDLS session between the first mobile device and the second mobile device. The system may transmit, by the first mobile device, a first power save notification to the access point and a second power save notification to the second mobile device, the first and second power save notifications indicating a change in operation mode of the first mobile device. The system may initiate, by the first mobile device, a change in operation mode from an original operation mode to a power save operation mode. The system may return, by the first mobile device, to the original operation mode. The system may either (i) transmit a trigger from the first mobile device to the access point upon returning to the original operation mode, and receive, by the first mobile device, buffered data from the access point, the buffered data indicating a current operation mode of the second mobile device, or (ii) receive, by the first mobile device, a beacon frame from the access point at a specific beacon interval, in response to the beacon frame, transmit, by the first mobile device, a trigger to the access point, and receive, by the first mobile device, buffered data from the access point, the buffered data indicating a current operation mode of the second mobile device. In some embodiments, the buffered data includes more than one operation mode change notification from the second mobile device, the current operation mode being identified by the most recent notification received by the access point from the second mobile device. In example embodiments, the beacon frame is a traffic indication map configured to alert the first mobile device of buffered data present. In some embodiments of the disclosure, the first power save notification indicates the first mobile device has disabled transceiver hardware. The system may further transmit a first updated operation mode notification intended for the access point, and transmit a second updated operation mode notification intended for the second mobile device, wherein the first and second updated operation mode notifications indicate the first mobile device has reverted to an original operation mode. In some embodiments, the second updated operation mode notification is a peer traffic indication frame. In some embodiments, the trigger is a buffered data probe.

In example embodiments of the disclosure, there may be a system. The system may include at least one memory that store computer-executable instructions and at least one processor configured to access the at least one memory. The at least one processor may be configured to execute the computer-executable instructions to receive, by a second mobile device, a TDLS setup request from a first mobile device via an access point, the access point in communication with the first mobile device and the second mobile device. The system may transmit, by the second mobile device, a TDLS response frame to the first mobile device via the access point, and receive, by the second mobile device from the first mobile device, a TDLS confirmation frame, thereby establishing a TDLS session between the first mobile device and the second mobile device. The system may receive, by the second mobile device, a first power save notification from the first mobile device, the first power save notification indicating a change in operation mode of the first mobile device, and transmit, by the second mobile device, a second power save notification to the access point, the second power save notification indicating a change in operation mode of the second mobile device. The system may transmit, by the second mobile device, a third power save notification to the access point intended for the first mobile device, the third power save notification indicating a change in operation mode of the second mobile device. The system may initiate, by the second mobile device, a change in operation mode from an original operation mode to a power save operation mode, and return, by the second mobile device, to the original operation mode. The system may either (i) transmit a trigger from the second mobile device to the access point upon returning to the original operation mode, based at least in part on the trigger, receive, by the second mobile device, buffered data indicating a current operation mode of the first mobile device, or (ii) receive, by the second mobile device, a beacon frame from the access point at a specific beacon interval. In response to the beacon frame, transmit, by the second mobile device, a trigger to the access point, and receive, by the second mobile device, buffered data from the access point, the buffered data indicating a current operation mode of the first mobile device. In some embodiments, the buffered data includes more than one operation mode change notification from the first mobile device, the current operation mode being identified by the last operation mode change notification received by the access point from the first mobile device. In some embodiments, the second mobile device returns to the original operation mode at a specific time interval. In one example, the first power save notification comprises a first data frame, the second power save notification comprises a second data frame, and the second data frame is a peer traffic indication frame. In some embodiments, the beacon frame is a traffic indication map configured to alert the second mobile device of buffered data present. In some embodiments, the second power save notification indicates the second mobile device has disabled transceiver hardware. In another example, the power save operation mode of the second mobile device is a sleep mode. In another embodiment, the power save operation mode of the second mobile device is a channel change mode. In another embodiment, the trigger is a buffered data probe.

Example embodiments of the disclosure may include a system. The system may include at least one memory that stores computer-executable instructions, and at least one processor configured to access the at least one memory. The at least one processor may be further configured to execute the computer-executable instructions to facilitate a tunneled direct link setup (TDLS) session between a first mobile device and a second mobile device. The at least one processor may be configured to receive a first power save notification from the first mobile device, the first power save notification indicating a change in operation mode of the first mobile device, and receive a second power save notification from the second mobile device, the second power save notification indicating a change in operation mode of the second mobile device. The at least one processor may also be configured to receive a third power save notification from the second mobile device intended for the first mobile device, the third power save notification indicating a change in operation mode of the second mobile device, and buffer the third power save notification. The at least one processor may be further configured to either (i) receive a trigger from the first mobile device, and based at least in part on the trigger, transmit the buffered third power save notification from the access point to the first mobile device, or (ii) transmit a beacon frame to the first mobile device at a specific beacon interval, in response to the beacon frame, receive a trigger from the first mobile device, and based at least in part on the trigger, transmit the buffered third power save notification to the first mobile device. In some embodiments, the at least one processor may be further configured to receive a first updated operation mode notification from the second mobile device, the first updated operation mode notification indicating the second mobile device has reverted to an original operation mode, and receive a second updated operation mode notification from the second mobile device intended for the first mobile device, the second updated operation mode notification indicating the second mobile device has reverted to an original operation mode. In some embodiments, the trigger is a buffered data probe received from the first mobile device. In some embodiments, the beacon frame is a traffic indication map configured to alert the first mobile device of buffered data present. In some embodiments, the first power save notification indicates the first mobile device has disabled transceiver hardware. In some embodiments, the first power save notification indicates the first mobile device is initiating a change in operation mode. In some embodiments, the at least one processor may be further configured to (i) receive a TDLS setup request from the first mobile device, (ii) transmit the TDLS setup request to the second mobile device, the TDLS setup request instructing the second mobile device to transmit a TDLS response frame, (iii) receive the TDLS response frame from the second mobile device, (iv) transmit the TDLS response frame to the first mobile device, (v) receive a TDLS confirmation frame from the first mobile device, and (vi) transmit the TDLS confirmation frame to the second mobile device.

Example embodiments of the disclosure may include a user device. The user device may include a first antenna communicatively coupled to a first transceiver and configured to receive or transmit one or more wireless signals associated with a mobile communications network, a second antenna communicatively coupled to a second transceiver and configured to receive or transmit one or more wireless signals associated with a WiFi network, and one or more processors configured to facilitate a tunneled direct link setup (TDLS) session between a first mobile device and a second mobile device. The one or more processors may be configured to receive a first power save notification from the first mobile device, the first power save notification indicating a change in operation mode of the first mobile device, and receive a second power save notification from the second mobile device, the second power save notification indicating a change in operation mode of the second mobile device. The one or more processors may be configured to receive a third power save notification from the second mobile device intended for the first mobile device, the third power save notification indicating a change in operation mode of the second mobile device, and buffer the third power save notification. The one or more processors may be configured to either (i) receive a trigger from the first mobile device, and based at least in part on the trigger, transmit the buffered third power save notification from the access point to the first mobile device, or (ii) transmit a beacon frame to the first mobile device at a specific beacon interval, in response to the beacon frame, receive a trigger from the first mobile device, and based at least in part on the trigger, transmit the buffered third power save notification to the first mobile device. In some embodiments, the one or more processors may be further configured to receive a first updated operation mode notification from the second mobile device, the first updated operation mode notification indicating the second mobile device has reverted to an original operation mode, and receive a second updated operation mode notification from the second mobile device intended for the first mobile device, the second updated operation mode notification indicating the second mobile device has reverted to an original operation mode. In some embodiments, the trigger is a buffered data probe received from the first mobile device. In some embodiments, the beacon frame is a traffic indication map configured to alert the first mobile device of buffered data present. In some embodiments, the first power save notification indicates the first mobile device has disabled transceiver hardware. In some embodiments, the first power save notification indicates the first mobile device is initiating a change in operation mode. In some embodiments, the one or more processors may be further configured to (i) receive a TDLS setup request from the first mobile device, (ii) transmit the TDLS setup request to the second mobile device, the TDLS setup request instructing the second mobile device to transmit a TDLS response frame, (iii) receive the TDLS response frame from the second mobile device, (iv) transmit the TDLS response frame to the first mobile device, (v) receive a TDLS confirmation frame from the first mobile device, and (vi) transmit the TDLS confirmation frame to the second mobile device.

The claimed invention is:

1. A method comprising:
   facilitating, via an access point comprising one or more computer processors, a tunneled direct link setup (TDLS) session between a first mobile device and a second mobile device;
   receiving, by the access point, a first power save notification from the first mobile device, the first power save notification indicating a change in operation mode of the first mobile device;
   receiving, by the access point, a second power save notification from the second mobile device intended for the access point, the second power save notification indicating a change in operation mode of the second mobile device;
   receiving, by the access point, a third power save notification from the second mobile device intended for the first mobile device, the third power save notification indicating a change in operation mode of the second mobile device;
   buffering, by the access point, the third power save notification;
   transmitting a beacon frame from the access point to the first mobile device at a specific beacon interval;
   in response to the beacon frame, receiving by the access point a trigger from the first mobile device; and
   based at least in part on the trigger, transmitting the buffered third power save notification from the access point to the first mobile device.

2. The method of claim 1, further comprising:
   receiving, by the access point, a first updated operation mode notification from the second mobile device intended for the access point, the first updated operation mode notification indicating the second mobile device has reverted to an original operation mode; and
   receiving, by the access point, a second updated operation mode notification from the second mobile device intended for the first mobile device, the second updated operation mode notification indicating the second mobile device has reverted to an original operation mode.

3. The method of claim 1, wherein the trigger is a buffered data probe received by the access point from the first mobile device.

4. The method of claim 1, wherein the beacon frame is a traffic indication map configured to alert the first mobile device of buffered data present.

5. The method of claim 1, wherein the first power save notification indicates the first mobile device has disabled transceiver hardware.

6. The method of claim 1, wherein the first power save notification indicates the first mobile device has initiated a change in operation mode.

7. The method of claim 1, wherein the tunneled direct link setup (TDLS) session between the first mobile device and the second mobile device is facilitated by:
   (i) receiving a TDLS setup request from the first mobile device;
   (ii) transmitting the TDLS setup request to the second mobile device, the TDLS setup request instructing the second mobile device to transmit a TDLS response frame;
   (iii) receiving the TDLS response frame from the second mobile device;
   (iv) transmitting the TDLS response frame to the first mobile device;
   (v) receiving a TDLS confirmation frame from the first mobile device; and
   (vi) transmitting the TDLS confirmation frame to the second mobile device.

8. A system comprising:
   at least one memory that store computer-executable instructions; and
   at least one processor configured to access the at least one memory, wherein the at least one processor is configured to execute the computer-executable instructions to:
   transmit, by a first mobile device, a tunneled direct link setup (TDLS) setup request to an access point, the access point in communication with the first mobile device and a second mobile device;
receive, by the first mobile device, a TDLS response frame from the second mobile device via the access point;
transmit, by the first mobile device, a TDLS confirmation frame, thereby establishing a TDLS session between the first mobile device and the second mobile device;
transmit, by the first mobile device, a first power save notification to the access point and a second power save notification to the second mobile device, the first and second power save notifications indicating a change in operation mode of the first mobile device;
initiate, by the first mobile device, a change in operation mode from an original operation mode to a power save operation mode;
return, by the first mobile device, to the original operation mode;
either (i) transmit a trigger from the first mobile device to the access point upon returning to the original operation mode; and
receive, by the first mobile device, buffered data from the access point, the buffered data indicating a current operation mode of the second mobile device, or
(ii) receive, by the first mobile device, a beacon frame from the access point at a specific beacon interval;
in response to the beacon frame, transmit, by the first mobile device, a trigger to the access point; and
receive, by the first mobile device, buffered data from the access point, the buffered data indicating a current operation mode of the second mobile device.

9. The system of claim 8, wherein the buffered data includes more than one operation mode change notification from the second mobile device, the current operation mode being identified by the most recent notification received by the access point from the second mobile device.

10. The system of claim 8, wherein the beacon frame is a traffic indication map configured to alert the first mobile device of buffered data present.

11. The system of claim 8, wherein the first power save notification indicates the first mobile device has disabled transceiver hardware.

12. The system of claim 8, wherein the at least one processor is further configured to execute the computer-executable instructions to:
transmit a first updated operation mode notification intended for the access point; and
transmit a second updated operation mode notification intended for the second mobile device;
wherein the first and second updated operation mode notifications indicate the first mobile device has reverted to an original operation mode.

13. The system of claim 12, wherein the second updated operation mode notification is a peer traffic indication frame.

14. The system of claim 8, wherein the trigger is a buffered data probe.

15. A system comprising:
at least one memory that store computer-executable instructions; and
at least one processor configured to access the at least one memory, wherein the at least one processor is configured to execute the computer-executable instructions to:
receive, by a second mobile device, a tunneled direct link setup (TDLS) setup request from a first mobile device via an access point, the access point in communication with the first mobile device and the second mobile device;
transmit, by the second mobile device, a TDLS response frame to the first mobile device via the access point;
receive, by the second mobile device from the first mobile device, a TDLS confirmation frame, thereby establishing a TDLS session between the first mobile device and the second mobile device;
receive, by the second mobile device, a first power save notification from the first mobile device, the first power save notification indicating a change in operation mode of the first mobile device;
transmit, by the second mobile device, a second power save notification to the access point, the second power save notification indicating a change in operation mode of the second mobile device;
transmit, by the second mobile device, a third power save notification to the access point intended for the first mobile device, the third power save notification indicating a change in operation mode of the second mobile device;
initiate, by the second mobile device, a change in operation mode from an original operation mode to a power save operation mode;
return, by the second mobile device, to the original operation mode;
either (i) transmit a trigger from the second mobile device to the access point upon returning to the original operation mode;
based at least in part on the trigger, receive, by the second mobile device, buffered data indicating a current operation mode of the first mobile device, or
(ii) receive, by the second mobile device, a beacon frame from the access point at a specific beacon interval;
in response to the beacon frame, transmit, by the second mobile device, a trigger to the access point; and
receive, by the second mobile device, buffered data from the access point, the buffered data indicating a current operation mode of the first mobile device.

16. The system of claim 15, wherein the buffered data includes more than one operation mode change notification from the first mobile device, the current operation mode being identified by the last operation mode change notification received by the access point from the first mobile device.

17. The system of claim 15, wherein the second mobile device returns to the original operation mode at a specific time interval.

18. The system of claim 15, wherein:
the first power save notification comprises a first data frame;
the second power save notification comprises a second data frame; and
the second data frame is a peer traffic indication frame.

19. The system of claim 15, wherein the beacon frame is a traffic indication map configured to alert the second mobile device of buffered data present.

20. The system of claim 15, wherein the second power save notification indicates the second mobile device has disabled transceiver hardware.

21. The system of claim 15, wherein the power save operation mode of the second mobile device is a sleep mode.

22. The system of claim 15, wherein the power save operation mode of the second mobile device is a channel change mode.

23. The system of claim 15, wherein the trigger is a buffered data probe.

24. A system comprising:
- at least one memory that stores computer-executable instructions; and
- at least one processor configured to access the at least one memory, wherein the at least one processor is further configured to execute the computer-executable instructions to:
- facilitate a tunneled direct link setup (TDLS) session between a first mobile device and a second mobile device;
- receive a first power save notification from the first mobile device, the first power save notification indicating a change in operation mode of the first mobile device;
- receive a second power save notification from the second mobile device, the second power save notification indicating a change in operation mode of the second mobile device;
- receive a third power save notification from the second mobile device intended for the first mobile device, the third power save notification indicating a change in operation mode of the second mobile device;
- buffer the third power save notification;
- transmit a beacon flame to the first mobile device at a specific beacon interval;
- in response to the beacon frame, receive a trigger from the first mobile device;
- and based at least in part on the trigger, transmit the buffered third power save notification to the first mobile device.

25. The system of claim 24, wherein the at least one processor is further configured:
- receive a first updated operation mode notification from the second mobile device, the first updated operation mode notification indicating the second mobile device has reverted to an original operation mode; and
- receive a second updated operation mode notification from the second mobile device intended for the first mobile device, the second updated operation mode notification indicating the second mobile device has reverted to an original operation mode.

26. The system of claim 24, wherein the trigger is a buffered data probe received from the first mobile device.

27. The system of claim 24, wherein the beacon frame is a traffic indication map configured to alert the first mobile device of buffered data present.

28. The system of claim 24, wherein the first power save notification indicates the first mobile device has disabled transceiver hardware.

29. The system of claim 24, wherein the first power save notification indicates the first mobile device is initiating a change in operation mode.

30. The system of claim 24, wherein the at least one processor is further configured to:
- (i) receive a TDLS setup request from the first mobile device;
- (ii) transmit the TDLS setup request to the second mobile device, the TDLS setup request instructing the second mobile device to transmit a TDLS response frame;
- (iii) receive the TDLS response frame from the second mobile device;
- (iv) transmit the TDLS response frame to the first mobile device;
- (v) receive a TDLS confirmation frame from the first mobile device; and
- (vi) transmit the TDLS confirmation frame to the second mobile device.

* * * * *